(12) United States Patent
Jhawar et al.

(10) Patent No.: US 11,971,698 B2
(45) Date of Patent: Apr. 30, 2024

(54) METHODS AND SYSTEMS FOR ASCERTAINING FACTORS CONTRIBUTING TO THE TEMPERATURE OF A DEVICE

(71) Applicant: Samsung Electronics Co., Ltd., Suwon-si (KR)

(72) Inventors: Aditya Jhawar, Bangalore (IN); Aditi Jaiswal, Bangalore (IN); Jaitirth Anthony Jacob, Bangalore (IN); Nikhil Sahni, Bangalore (IN); Hakryoul Kim, Suwon-si (KR); Jongwoo Kim, Suwon-si (KR); Sungyong Bang, Suwon-si (KR); Sunghun Jung, Suwon-si (KR); Suraj Jha, Bangalore (IN); Vaisakh Punnekkattu Chirayil Sudheesh Babu, Bangalore (IN); Renju Chirakarotu Nair, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 17/248,677

(22) Filed: Feb. 2, 2021

(65) Prior Publication Data

US 2021/0240156 A1    Aug. 5, 2021

(30) Foreign Application Priority Data

Feb. 3, 2020    (IN) .............................. 202041004653
Dec. 10, 2020   (IN) .............................. 202041004653

(51) Int. Cl.
  *G05B 19/406*    (2006.01)
  *G06N 3/08*      (2023.01)
(52) U.S. Cl.
  CPC ............. *G05B 19/406* (2013.01); *G06N 3/08* (2013.01); *G05B 2219/49217* (2013.01)

(58) Field of Classification Search
  CPC ........ G05B 19/406; G05B 2219/49217; G06N 3/08; G06N 3/045; G06N 3/063; G06F 11/3044; G06F 11/3058
  See application file for complete search history.

(56) References Cited

U.S. PATENT DOCUMENTS

| 8,280,673 B2 | 10/2012 | Aljabari |
| 2003/0231006 A1 | 12/2003 | Tojima |

(Continued)

FOREIGN PATENT DOCUMENTS

| CN | 109828882 A | 5/2019 |
| JP | 2011-027644 A | 2/2011 |

(Continued)

OTHER PUBLICATIONS

Breda, et al. "Hot or Not: Leveraging Mobile Devices for Ubiquitous Temperature Sensing", BuildSys '19, Nov. 13-14, 2019, New York, NY, USA, 10 pages.

(Continued)

*Primary Examiner* — Mohammad Ali
*Assistant Examiner* — Saad M Kabir

(57) ABSTRACT

Methods and systems for ascertaining factors contributing to the temperature of a device. A method includes monitoring a plurality of parameters that are contributing to a temperature of the device. The method also includes estimating a degree of contribution of internal factors to the temperature of the device based on the monitored plurality of parameters and a battery temperature of a battery of the device. The method further includes estimating a degree of contribution of external factors to the temperature of the device, based on the monitored plurality of parameters and a battery temperature of a battery of the device. A neural network can be used (Continued)

for estimating the temperature of the ambience of the device and the impacts of internal and external factors on temperature of the device.

17 Claims, 5 Drawing Sheets

(56) References Cited

U.S. PATENT DOCUMENTS

| | | |
|---|---|---|
| 2009/0072795 A1 | 3/2009 | Lovett |
| 2014/0163765 A1 | 6/2014 | Jain et al. |
| 2016/0146678 A1 | 5/2016 | Kalyanasundaram |
| 2016/0252268 A1 | 9/2016 | Aljabari et al. |
| 2019/0293494 A1 | 9/2019 | Mao et al. |
| 2020/0301487 A1 | 9/2020 | Bamba et al. |

FOREIGN PATENT DOCUMENTS

| | | |
|---|---|---|
| KR | 10-2015-0131635 A | 11/2015 |
| TW | 201527961 A | 7/2015 |
| WO | 2019059000 A1 | 3/2019 |

OTHER PUBLICATIONS

Chau, et al. "Estimation of air temperature using smartphones in different contexts", Journal of Information and Telecommunication, Taylor & Francis Group, 2019, vol. 3, No. 4, 15 pages.
International Search Report and Written Opinion of the International Searching Authority dated Apr. 22, 2021 in connection with International Application No. PCT/KR2021/001001, 8 pages.
Examination report dated Dec. 15, 2021, in connection with Indian Application No. 202041004653, 5 pages.

METHODS AND SYSTEMS FOR ASCERTAINING FACTORS CONTRIBUTING TO THE TEMPERATURE OF A DEVICE

CROSS REFERENCE TO RELATED APPLICATIONS

This application is based on and claims priority under 35 U.S.C. § 119 to Indian Provisional Patent Application No. 202041004653, which was filed on Feb. 3, 2020, and Indian Complete Patent Application No. 202041004653, which was filed on Dec. 10, 2020, the disclosure of which is incorporated by reference herein in its entirety.

BACKGROUND

1. Field

Embodiments herein relate to thermal modeling of devices, and more particularly to methods and systems for utilizing neural networks for ascertaining factors that are contributing to the temperature of a device.

2. Description of the Related Art

The temperature in the ambience of a device can contribute to the temperature of the device. The temperature of the device is also contributed to by hardware components in the device such as Central Processing Unit (CPU), Graphics Processing Unit (GPU), CPU load, GPU load, Battery temperature, and so on. However, it is observed that, if the temperature of the device is high, the cause of a rise in the temperature of the device (overheating of the device) is attributed to the usage of the device and the hardware components in the device without consideration of the temperature of the ambience of the device. When the device detects the rise in the device temperature, the device can trigger an on-device overheating protection mechanism for thermal mitigation, which reduces that the temperature of the device to the normal (desirable) levels.

The overheating protection mechanism may throttle the resources of the device, which could be having an impact in causing the temperature of the device to rise. In an example, if the device is availing services involving data transfer, such as download, upload, streaming, and so on, through a Fifth Generation (5G) network, then a fallback mechanism is triggered, which triggers a handover of the services from the 5G network to a Fourth Generation (4G) network. This can reduce the speed of data transfer, thereby degrading the user experience. In another example, if a gaming application is running in the device, which is contributing to the rise in the temperature of the device, then the number of frames-per-second of the display is reduced. The reduction in the number of frames-per-second can directly impact the user experience. If the number of frames-per-second is reduced, then the transitions of the scenes of the game in the display will no longer be seamless.

In yet another example, if the temperature of the device increases, fast charging is disabled and heavy usage (running multiple applications at the same time) is prevented. This is because fast charging could contribute to the rise in the temperature of the device by increase in the flow of current and heavy usage of the device could contribute to the rise in the temperature of the device by increasing the rate of discharge.

The temperatures in the different regions of the world during the different seasons of the year are expected to vary widely. Therefore, having a static thermal throttling policy, for throttling the resources of the device, when the temperature of the device rises above the predefined normal levels, may not be efficient. This is because in warmer regions of the world, the temperature of the device is contributed to primarily by the ambient temperature. If the temperature contributed by the hardware components in two devices is same (considering a similar usage pattern), wherein one of the devices is in the warmer region and the other device is in a cooler region, then the temperature of the device in the warmer region will be higher than the temperature of the device in the cooler region. Thus, if the usage pattern of the two devices is same, the resources of the device in the warmer region will be throttled earlier than the resources of the device in the cooler region.

For example, considering the summer season, the day temperature in a town in Saudi Arabia is likely to be higher than that in a town in Switzerland. In this scenario, if the thermal throttling policy is static, then the overheating protection unit may throttle the resources of a device being operated in Saudi Arabia earlier than a device being operated in Switzerland, even if the usage pattern of both the devices is same/identical (temperature contributed by the hardware components in the two devices are same/identical).

In order to avoid unnecessary throttling of the resources of the device, the existing systems include dedicated sensors in the device, which are configured to measure the temperature of the ambience of the device. However, the measurement of the ambient temperature is likely to be influenced by the contributions to the temperature of the device by the hardware components of the device. Therefore, the measurement of the temperature of the device using dedicated ambient temperature measurement sensors may not be accurate.

Currently, the device can include multiple thermistors, wherein each thermistor is dedicated to measure the temperature of the hardware components (units) of the device. For example, the various units of a processor package in the device can include internal thermistors, dedicated to individually measure the temperatures of the various units such as Digital Signal Processor (DSP), GPU, CPUs, communication unit, modem, codec, and so on, for obtaining the thermal state of the units and perform thermal mitigation decisions. There are also dedicated thermistors for measuring the temperatures of the units that are external (peripheral) to the processor package such as battery, charger, sensor, camera, and so on, for performing thermal mitigation decisions. These thermistors can significantly increase the package cost and cost of the Bill of Material (BOM) for the device.

SUMMARY

The principal object of the embodiments herein is to disclose methods and systems for estimating the temperature of the ambience of the device, and estimating the impacts of the factors that are internal to the device and the factors that are external to the device on the temperature of the device, using a neural network.

Another object of the embodiments herein is to estimate the impact of the internal factors on the temperature of the device based on a plurality of parameters pertaining to the device.

Another object of the embodiments herein is to determine whether the temperature of the battery of the device is greater/less than impact of the external factors on the temperature of the device based on the estimated impact of the internal factors on the temperature of the device.

Another object of the embodiments herein is to utilize regression and classification neural network models for estimating the impact of the internal factors on the temperature of the device, the impact of the external factors on the temperature of the device, and whether the impact of the external factors on the temperature of the device is greater/less than the impact of the external factors on the temperature of the device.

Another object of the embodiments herein is to train the regression and classification neural network models for predicting the temperature of the ambience of the device, determine at least one parameter which is contributing to the temperature of the device, and initiate a mechanism to control the at least one factor contributing to the temperature of the device.

Accordingly, the embodiments provide methods and systems for estimating whether the temperature of a device is primarily contributed by factors internal to the device or factors external to the device. The embodiments include monitoring a plurality of parameters, which can contribute to the temperature of the device. The monitoring of the parameters allows determining the impact of the internal factors on the temperature of the device. The embodiments include estimating a degree of contribution of the internal factors to the temperature of the device and a degree of contribution of external factors to the temperature of the device. The embodiments include determining the degrees of contributions by the internal and external factors, to the temperatures of the device, based on the plurality of parameters and a temperature of a battery of the device.

In an embodiment, the plurality of parameters acts as features of a neural network model. The neural network model determines the degree of contribution of the internal factors to the temperature of the device based on the plurality of parameters, which are obtained periodically over a period of observation. The degree of contribution of the internal factors represents a difference between a temperature of a battery of the device and a temperature of the ambience of the device. The temperature of the ambience of the device represents the degree of contribution of the external factors to the temperature of the device. The neural network model determines the degree of degree of contribution of the external factors to the temperature of the device based on the degree of contribution of the internal factors to the temperature of the device and the temperature of the battery of the device.

The embodiments include determining whether the degree of contribution of the internal factors to the temperature of the device is greater than the degree of contribution of the external factors to the temperature of the device. If the temperature of the battery of the device is greater than the temperature of the ambience of the device, then the degree of contribution of the internal factors to the temperature of the device is greater than the degree of contribution of the external factors to the temperature of the device. Similarly, if the temperature of the battery of the device is less than the temperature of the ambience of the device, then the degree of contribution of the external factors to the temperature of the device is greater than the degree of contribution of the internal factors to the temperature of the device.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, through out which like reference letters indicate corresponding parts in the various figures. The embodiments herein will be better understood from the following description with reference to the drawings, in which.

DETAILED DESCRIPTION

Figure 1:
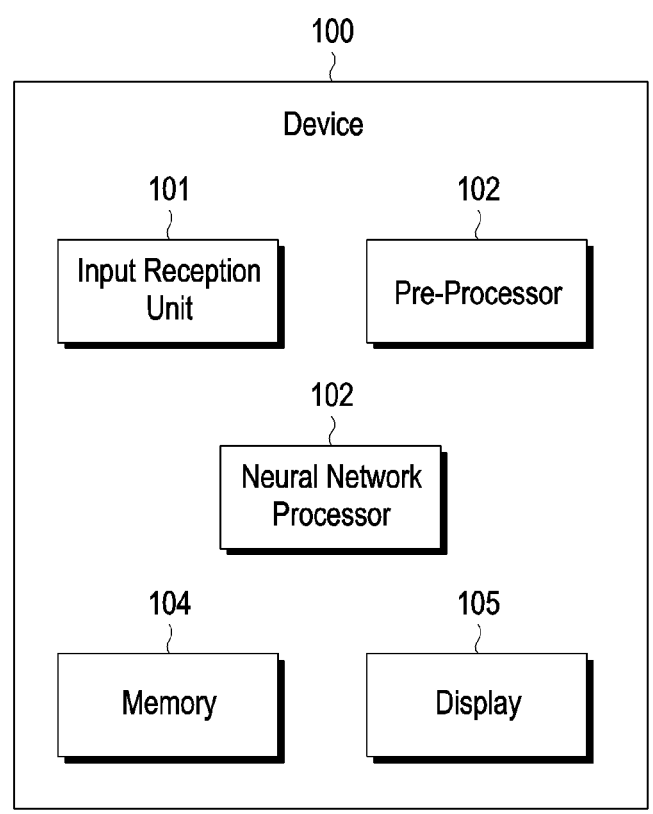
FIG. 1 illustrates a device configured to estimate degrees of contributions of factors that are internal and external to the device, to the temperature of the device, according to embodiments as disclosed herein.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for utilizing neural networks for estimating the temperature of the ambience of the device and ascertaining factors, internal or external to the device, which are primarily contributing to the temperature of the device. The embodiments include estimating the contribution of internal factors to the temperature of the device based on a plurality of parameters. The embodiments include estimating the contribution of the external factors to the temperature of the device based on the contribution of the internal factors to the temperature of the device and the temperature of the battery of the device.

The embodiments include utilizing a regression neural network model for estimating the contribution of the internal factors. The embodiments include monitoring the values of a plurality of parameters pertaining to the device and estimating the contribution of the internal factors to the temperature of the device based on the values of the plurality of parameters. The embodiments include utilizing a classification neural network model for estimating whether the contribution of the internal factors to the temperature of the device is greater than or less than the contribution of the external factors to the temperature of the device. The embodiments include training the regression and classification neural network models for predicting the temperature of the ambience of the device, determining at least one parameter which is primarily contributing to the temperature of the device (if any), and initiate mechanisms to control the temperature of the device if the temperature of the device is above predetermined normal levels.

Referring now to the drawings, and more particularly to FIGS. 1 through 4, where similar reference characters denote corresponding features consistently throughout the figures, there are shown preferred embodiments.

FIG. 1 illustrates a device 100 configured to estimate degrees of contributions of factors that are internal and external to the device 100, to the temperature of the device 100, according to embodiments as disclosed herein. As depicted in FIG. 1, the device 100 includes an input reception unit 101, a pre-processor 102, a neural network processor 103, a memory 104, and a display 105. Examples of the device 100 are, but not limited to, a smart phone, a tablet, a laptop, a desktop, a User Equipment (UE), a computing device, a personal computer, an Internet of Things (IoT) device, a wearable device, a virtual reality device, and so on.

The device 100 is configured to determine a plurality of parameters, which are acting as causes of overheating of the device 100. An accurate mapping of the plurality of parameters to the temperature of the device 100 using neural network models allow determining whether the overheating of the device 100 is due to the internal factors or external factors, and, correspondingly, improve the decision making involved in throttling of the resources of the device 100, for mitigating the overheating of the device 100, if any. The mapping allows determining the temperature of the ambience of the device 100 without the aid of thermistors and temperature sensors, which can greatly reduce the packaging cost and the cost of Bill of Materials (BOM) of the device 100.

In an embodiment, the neural network processor 103 can report the cause of overheating of the device 100 and the estimate (or predicted) of the ambient temperature of the device 100 to the System Intelligence (SI) (not shown) of the device 100. The neural network processor 103 can be considered as an Ambient Temperature Awareness (ATA) model, which can estimate/predict the temperature of the ambience of the device 100. When an application in the device 100 or the user of device 100 requests for the ambient temperature, the ATA can receive the request, the ATA estimates/predicts the temperature of the ambience of the device 100 and provides the estimated/predicted value of the temperature of the ambience of the device 100 to the SI.

The input reception unit 101 can monitor the values of the plurality of parameters, which are capable of contributing to the temperature of the device 100. The plurality of parameters include, but not limited to, Central Processing Unit (CPU) load, Graphics Processing Unit (GPU) load, data upload rate, data download rate, average battery temperature, display brightness, rate of variation of battery temperature, instantaneous battery temperature, volume of at least one speaker of the device 100, or at least one speaker connected to the device 100, State of Charge (SoC) of the battery of the device, battery discharge rate, current flow through the battery of the device 100, other hardware components of the device 100, lux, and number of frames-per-second in the display 105.

Consider that five processes are running on the device 100, wherein each of the five processes is utilizing respective fractions of the processing power of the device 100. Each of the five processes is contributing to the CPU load. The input reception unit 101 can monitor the values of the CPU load and store the values of the CPU load in a database of the memory 104. The input reception unit 101 can periodically provide the values of the CPU load to the pre-processor 102. Similarly, the input reception unit 101 provides the values of the GPU load, parameters pertaining to data transfer rate, parameters pertaining to the battery of the device 100, and so on, periodically. In an example, the input reception unit 101 can provide the values of the plurality of parameters to the pre-processor 102 in data-sets, every five minutes.

The pre-processor 102 can receive the values of each of the plurality of parameters in a plurality of data-sets. Considering that each of the plurality of data-sets is being received every five minutes, the pre-processor 102 normalizes the values in the plurality of data-sets, corresponding to the plurality of parameters. Consider the input reception unit 101 reports the values of each of the plurality of parameters every five seconds. Therefore, over a period of five minutes, each of the plurality of data-sets accumulates 60 values. In an embodiment, the pre-processor 102 computes a plurality of mean values for each of the plurality of data-sets. Each of the plurality of mean values, corresponding to the plurality of data-sets, can be considered as features that can be provided as input to the neural network processor 103. The pre-processor 102 can scale the features such that the scaled features follow a distribution with a mean of 0 and a variance of 1. The pre-processor 102 can provide the scaled features to the neural network processor 103.

The neural network processor 103 is trained to predict the impact of the internal factors on the temperature of the device 100. The neural network processor 103 provides the impact of the internal factors as output, which is represented as a value of temperature. The value of temperature represents the degree of contribution of the internal factors to the temperature of the device. The plurality of parameters are acting as the internal factors, which are contributing to the temperature of the device 100. The neural network processor 103 can estimate the degree of contribution of the internal factors to the temperature of the device based on the scaled features provided to the neural network processor 103 by the pre-processor 102.

The degree of contribution of the internal factors to the temperature of the device 100 can be considered as a difference between the temperature of the battery of the device 100 (not shown) and a temperature of the ambience of the device 100. This is because the temperature of the battery of the device 100 strongly correlates with the temperature of the device 100. Further, the temperature of the ambience of the device 100 represents the impact of the external factors on the temperature of the device 100. Thus, the degree of contribution of the internal factors to the temperature of the device 100 is the impact of the external factors on the temperature of the device 100 isolated from the temperature of the device 100. The temperature of the ambience of the device 100 can correlate to the degree of contribution of the external factors to the temperature of the device 100. As the external factors contribute to the temperature of the ambience of the device 100, the external factors can be considered as contributors to the temperature of the device 100.

In an embodiment, the neural network processor 103 comprises a regression neural network model and a classification neural network model. The regression model can be configured to estimate the degree of contribution of the internal factors to the temperature of the device 100, based on the plurality of parameters (features fed to the neural network processor 103). The classification model can be configured to estimate if the degree of contribution of the internal factors to the temperature of the device 100 is greater than or less than the degree of contribution of the external factors to the temperature of the device 100.

The neural network processor 103 can be trained in a variety of scenarios in different ambient conditions, to predict the impacts of the internal factors and the external factors on the temperature of the device 100. The training environment of the neural network processor 103 can be a thermal chamber, which can allows maintaining a steady temperature in the ambience of the device 100. The steadiness of the temperature in the thermal chamber (temperature of the ambience of the device 100) can be verified using a thermal camera. In an embodiment, the different scenarios can be applied in a particular sequence and the ambient temperature of the device 100 (in the thermal chamber) can be increased progressively.

In an example, the scenarios can be, but not limited to, gaming, streaming, video conference, broadcasting, audio/video calling, surfing, fast charging, fast discharge, video recording, heavy usage, and so on. The scenarios can be applied in different orders and the ambient temperature can be increased as the scenarios are changed. The plurality of parameters can be monitored during the different scenarios in different ambient conditions. The values of the plurality of parameters, arranged in data-sets are pre-processed to obtain input features.

The neural network processor 103 can estimate the degrees of contributions of the internal factors and the external factors to the temperature of the device 100 based on the input features. The neural network processor 103 can predict the impact of the internal factors on the temperature of the device 100, which can be used for determining whether the impact of the ambient temperature, i.e., external factors, on the temperature of the device 100 is greater/less than that of the internal factors. The weights of the regression model and the classification model can be adjusted to improve the accuracy of estimation of the degrees of contributions to the temperature of the device 100 by the internal factors and the external factors.

Once the neural network 103 has been trained, the neural networks can periodically receive the scaled values of the features from the pre-processor 102. The features are representing the values of the plurality of parameters, which are monitored by the input reception unit 101. The monitored plurality of parameters are the internal factors contributing to the temperature of the device 100. The neural network processor 103 can estimate the degree of contribution of the internal factors to the temperature of the device 100 (or impact of the internal factors on the temperature of the device 100) based on the scaled values of the features.

As the estimate of the degree of contribution of the internal factors to the temperature of the device 100 pertains to a difference between the temperature of the battery of the device 100 and the temperature of the ambience of the device 100, the ambient temperature or the estimate of degree of contribution of the external factors to the temperature of the device 100 can be determined based on the estimate of the degree of contribution of the internal factors to the temperature of the device 100 and the temperature of the battery of the device 100.

If a result of subtraction of the temperature of the ambience of the device 100 ($T_{ambient}$) is from the temperature of the battery of the device 100 ($T_{Battery}$), i.e., ($T_{Battery}-T_{ambient}$), is less than zero (0), then, the temperature of the ambience of the device 100 is greater than the temperature of the battery of the device 100. In this scenario, the temperature of the ambience of the device 100 can be estimated by adding the estimate of the degree of contribution of the internal factors to the temperature of the device 100 and the temperature of the battery of the device 100.

If a result of subtraction of the temperature of the ambience of the device 100 ($T_{ambient}$) is from the temperature of the battery of the device 100 ($T_{Battery}$), i.e., ($T_{Battery}-$ $T_{ambient}$), is more than zero (0), then, the temperature of the ambience of the device 100 is less than the temperature of the battery of the device 100. In this scenario, the temperature of the ambience of the device 100 can be estimated by subtracting the estimate of the degree of contribution of the internal factors to the temperature of the device 100 and the temperature of the battery of the device 100.

The estimate of the degree of contribution of the internal factors to the temperature of the device 100 is the magnitude of the result of subtraction of the temperature of the ambience of the device 100 ($T_{ambient}$) from the temperature of the battery of the device 100 ($T_{Battery}$). Therefore, when the temperature of the ambience of the device 100 is greater than the temperature of the battery of the device 100, the impact of the external factors on the temperature of the device 100 is greater than the impact of the internal factors on the temperature of the device 100. Thus, the degree of contribution of the internal factors to the temperature of the device 100 is added with the temperature of the battery of the device 100 to obtain the estimate of the temperature of the ambience of the device 100.

When the temperature of the ambience of the device 100 is less than the temperature of the battery of the device 100, the impact of the internal factors on the temperature of the device 100 is greater than the impact of the external factors on the temperature of the device 100. Therefore, the degree of contribution of the internal factors to the temperature of the device 100 is subtracted from the temperature of the battery of the device 100 to obtain the estimate of the temperature of the ambience of the device 100.

In an embodiment, the regression neural network model estimates the degree of contribution of the internal factors to the temperature of the device 100, which can be considered as computing the difference between the temperature of the battery of the device 100 and the temperature of the ambience of the device 100. The actual value of the temperature of the ambience of the device 100 is determined based on the degree of contribution of the internal factors to the temperature of the device 100.

The classification neural network model determines if the temperature of the ambience of the device 100 is greater than or less than the temperature of the battery of the device 100, thereby determining whether the temperature of the device 100 is primarily contributed to by the internal factors or the external factors. If the temperature of the device 100 is primarily contributed to by the internal factors (battery temperature is greater than the ambient temperature), and if the temperature of the device 100 is above predefined normal levels, the device 100 can activate mechanisms, which can curb the rise in the temperature of the device 100.

In an example, the device 100 may adapt the pattern of charging the battery of the device based on the estimated values of temperatures contributed by the internal and external factors, to the temperature of the device 100. The adaptation in the pattern of charging the battery allows reducing the temperature of the device or improving the safety and charging experience. If the temperature of the ambience of the device 100 is high and is causing the device 100 to overheat, then the device 100 can prevent fast charging of the battery of the device 100 (which increases the current plot and in turn increases the temperature of the device 100). If the temperature of the device 100 is normal and the ambient temperature is normal, then the device 100 can recommend fast charging of the battery.

In another example, the 5G capability of the device 100 may be enabled or disabled, thereby causing a fallback to a 4G network, based on the estimated values of temperatures contributed by the internal and external factors, to the temperature of the device 100. The disablement of the 5G capability prevents the device 100 from performing 5G measurements, which prevents further heating of the device 100 (considering that the device 100 is overheated). Further, the disablement of the 5G capability of the device 100 constrains the streaming power of the device 100, thereby reducing the rate of download of data. If the temperature of the ambience of the device 100 is high and is causing the device 100 to overheat, then the device 100 can trigger a 4G fallback. If the temperature of the device 100 is normal and the ambient temperature is normal, then the device 100 can enable 5G connectivity.

If the temperature of the device 100 is primarily contributed to by the external factors (battery temperature is less than the ambient temperature), and if the temperature of the device 100 is above predefined normal levels, the device 100 can suggest actions, which can curb the rise in the temperature of the device 100 and allow the temperature of the device 100 to attain normal levels.

FIG. 1 shows exemplary units of the device 100, but it is to be understood that other embodiments are not limited thereon. In other embodiments, the device 100 may include less or more number of units. Further, the labels or names of the units of the device 100 are used for illustrative purpose and do not limit the scope of the disclosure. One or more units can be combined together to perform same or a substantially similar function in the device 100.

Figure 2:
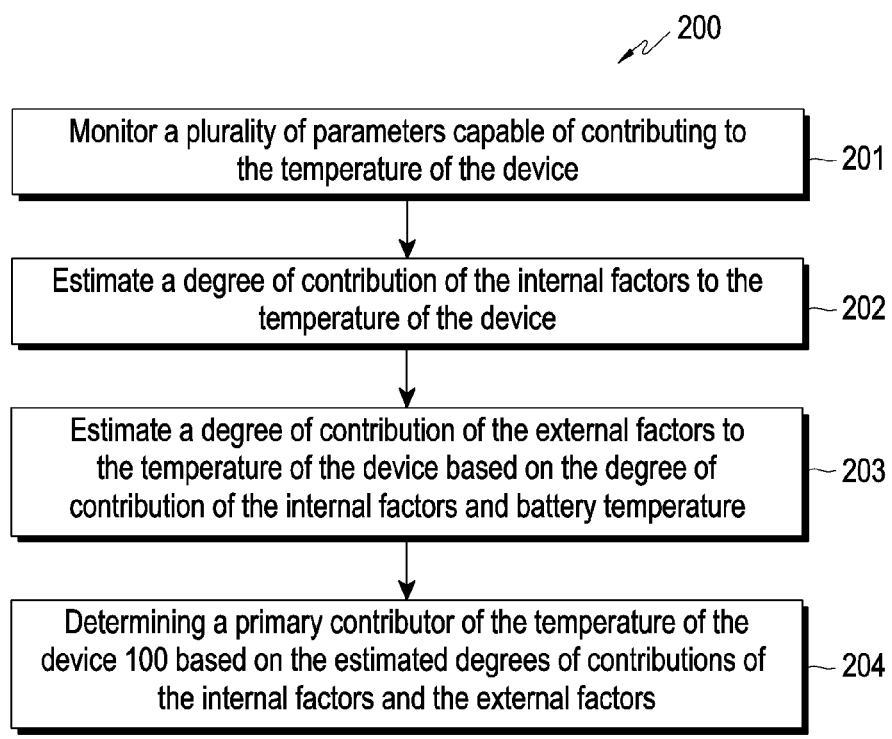
FIG. 2 illustrates a flowchart depicting a method for estimating whether the temperature of the device is primarily contributed by factors internal to the device or factors external to the device 100, according to embodiments as disclosed herein.

FIG. 2 illustrates a flowchart 200 depicting a method for estimating whether the temperature of the device 100 is primarily contributed by factors internal to the device 100 or factors external to the device 100, according to embodiments as disclosed herein. At step 201, the method includes monitoring a plurality of parameters capable of contributing to the temperature of the device 100. The embodiments include obtaining a plurality of values pertaining to each of the plurality of parameters during each the monitoring period. In an example, consider that in a monitoring period of five minutes, the embodiments include obtaining the plurality of values pertaining to each of the plurality of parameters. In the next monitoring period of five minutes, the process of obtaining the plurality of values is repeated. Therefore, the embodiments include periodically (for example every five minutes) estimating whether the temperature of the device 100 is primarily contributed by the internal factors or the external factors.

In an example, the embodiments can monitor lux as one of the plurality of parameters. The value of lux can be obtained using light detection sensors in the device 100. The embodiments can determine, based on lux, whether the temperature of the device 100 is primarily contributed by the external factors or the internal factors. For instance, the value of lux is detected to be higher when the device 100 is in natural light, compared to the value of lux when the device 100 is in artificial light. As sunlight is the primary external factor contributing to the temperature of the device 100, a higher value of lux can indicate that the temperature of the device 100 is primarily contributed by the external factors.

The embodiments can monitor the Wireless-Fidelity (Wi-Fi) signal strength to determine whether the temperature of the device 100 is primarily contributed by the internal factors or the external factors. The Wi-Fi signal strength is expected to be weaker in an outdoor environment compared to an indoor environment. The embodiments can determine that a rise in the temperature of the 100 is due to internal factors, if the Wi-Fi signal strength is strong. The embodiments determine that a rise in the temperature of the 100 is due to external factors, if the Wi-Fi signal strength is weak.

At step 202, the method includes estimating a degree of contribution of the internal factors to the temperature of the device 100. The degree of contribution of the internal factors contributing to the temperature of the device 100 can be determined using the neural network processor 103, based on the values of the monitored parameters. The values of the plurality of parameters are provided to the neural network processor 103 as input features. In an embodiment, the output of the neural network processor 103 can be considered as a difference between the temperature of the device 100 and a temperature of the ambience of the device 100.

The temperature of the battery of the device 100 correlates with the temperature of the device 100. Therefore, the embodiments consider the temperature of the battery of the device 100 to be the temperature of the device 100. If the temperature of the device 100 can be isolated from the ambient temperature or contribution of external factors to the temperature of the device 100, the embodiments can obtain the contribution of internal factors to the temperature of the device 100. Therefore, the output of the neural network processor 103, which is a representative of the difference between the temperature of the device 100 and the temperature of the ambience of the device 100, represents the degree of contribution of the internal factors to the temperature of the device 100. In an embodiment, a regression model can be utilized for estimating the degree of contribution of the internal factors.

At step 203, the method includes estimating a degree of contribution of the external factors to the temperature of the device 100 based on the degree of contribution of the internal factors to the temperature of the device 100 and the temperature of the battery of the device 100. Once the degree of contribution of the internal factors contributing to the temperature of the device 100 is estimated, the embodiments include estimating the degree of contribution of the external factors based on the contribution of the internal factors and the temperature of the battery of the device 100. In an embodiment, the degree of contribution of the external factors to the temperature of the device 100 can be considered as the temperature of the ambience of the device 100.

In an embodiment, consider that the subtraction of the temperature of the ambience of the device 100 from the temperature of the battery of the device 100 results in a negative value. As the output of the neural network processor 103 represents the difference between the temperature of the battery of the device 100, i.e., the temperature of the device 100, and the temperature of the ambience of the device 100, the result of the subtraction implies that the temperature of the ambience of the device 100 is greater than the temperature of the battery of the device 100. Therefore, the temperature of the ambience of the device 100 (the degree of contribution of the external factors to the temperature of the device 100) can be estimated by adding the estimate of the degree of contribution of the internal factors to the temperature of the device 100 and the temperature of the battery of the device 100.

In an embodiment, consider that the subtraction of the temperature of the ambience of the device 100 from the temperature of the battery of the device 100 results in a positive value. As the output of the neural network processor 103 represents the difference between the temperature of the battery of the device 100, i.e., the temperature of the device 100, and the temperature of the ambience of the device 100, the result of the subtraction indicates that the temperature of the battery of the device 100 is greater than the temperature of the ambience of the device 100. Therefore, the degree of contribution of the external factors to the temperature of the device 100 (the temperature of the ambience of the device 100) can be estimated by subtracting the estimate of the degree of contribution of the internal factors to the temperature of the device 100 from the temperature of the battery of the device 100.

At step 204, the method includes determining a primary contributor of the temperature of the device 100 based on the estimated degrees of contributions of the internal factors and the external factors. In an embodiment, a classification model can be configured to estimate whether the degree of contribution of the internal factors to the temperature of the device 100 is greater than or less than the degree of contribution of the external factors to the temperature of the device 100.

When the temperature of the ambience of the device 100 is greater than the temperature of the battery of the device 100, the impact of the external factors on the temperature of the device 100 is considered to be greater than the impact of the internal factors on the temperature of the device 100. When the temperature of the ambience of the device 100 is less than the temperature of the battery of the device 100, the impact of the internal factors on the temperature of the device 100 is considered to be greater than the impact of the external factors on the temperature of the device 100.

Therefore, the classification model can specify whether the internal factors or the external factors are acting as the primary contributor to the temperature of the device 100. The embodiments include performing an appropriate action to maintain the temperature of the device 100 at normal levels. In an embodiment, a thermal management system in the device 100 can utilize the estimated value of the ambient temperature for appropriate initiating heat management mechanisms as per the geographical location of the device. In an embodiment, the device 100 can recommend usage patterns and/or actions to a user of the device 100, which provides that the temperature of the device 100 remains in the normal range.

For example, if the device 100 detects that the user is using a gaming application in direct sunlight based on parameters such as CPU load, GPU load, and lux, and determines that the external factors are the primary contributor to the temperature of the device 100, then the device can recommend the user to change the position (prevent exposing the device to sunlight) or suggest the user to stop using the gaming application as long as the device 100 is exposed to sunlight. Similarly, if the user is charging the device 100 and the device 100 is exposed to sunlight, then the device 100 can slow down the rate of charging.

The device 100 can perform efficient management of 4th Generation (4G) or 5th Generation (5G) connectivity. The device 100 prevents unnecessary handovers from 5G to 4G by identifying whether the temperature of the device 100 had risen due to high ambient temperature. The device 100 performs efficient 5G antenna management. The device 100 prevents switching the antenna from direct node on determining that the external factors are the primary contributor to the temperature of the device 100. This prevents any possible reduction of bandwidth and data rate.

The various actions in the flowchart 200 may be performed in the order presented, in a different order, or simultaneously. Further, in some embodiments, some actions listed in FIG. 2 may be omitted.

FIGS. 3A-3D illustrate example plots depicting comparisons between the temperature of the ambience of the device 100, which have been predicted by the neural network in different scenarios, and the actual temperature of the ambience of the device 100, according to the embodiments as disclosed herein. The neural network processor 103, comprising the regression neural network model and the classification neural network model, is trained in a thermal chamber. The temperature of the thermal chamber is maintained at a particular temperature, which can be increased or decreased. The temperature of the thermal chamber represents the temperature of the ambience of the device 100.

The neural network processor 103 is trained in different scenarios at various ambient temperatures. In an embodiment, a gaming application is run on the device 100 at an ambient temperature of 30° C. In this scenario, the neural network processor 103 receives the values of the plurality of parameters as features and estimates the degree of contribution of the internal factors to the temperature of the device 100. Thereafter, the neural network processor 103 predicts the ambient temperature of the device 100 (degree of contribution of the external factors to the temperature of the device 100) based on the temperature of the battery of the device 100.

Figure 3A:
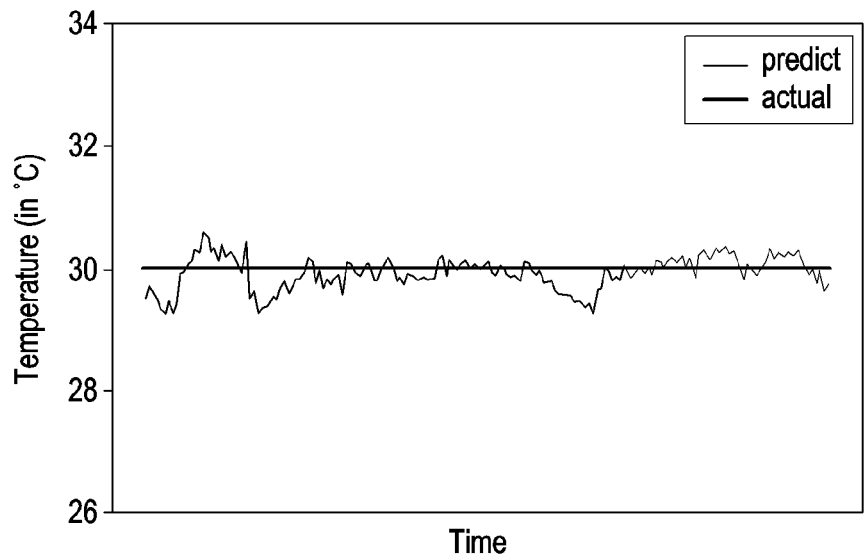
FIGS. 3A-3D illustrate example plots depicting comparisons between the temperature of the ambience of the device, which have been predicted by a neural network model in the device in different scenarios, and the actual temperature of the ambience of the device, according to the embodiments as disclosed herein.

In an embodiment, the neural network processor 103 can be tested for a predefined time period at an ambient temperature of 30° C., wherein the neural network processor 103 predicts the ambient temperature of the device 100. As depicted in FIG. 3A, the neural network processor 103 predicts the ambient temperature of the device 100 with a high accuracy (with a variation between the actual value and predicted value less than 1° C.).

Figure 3B:
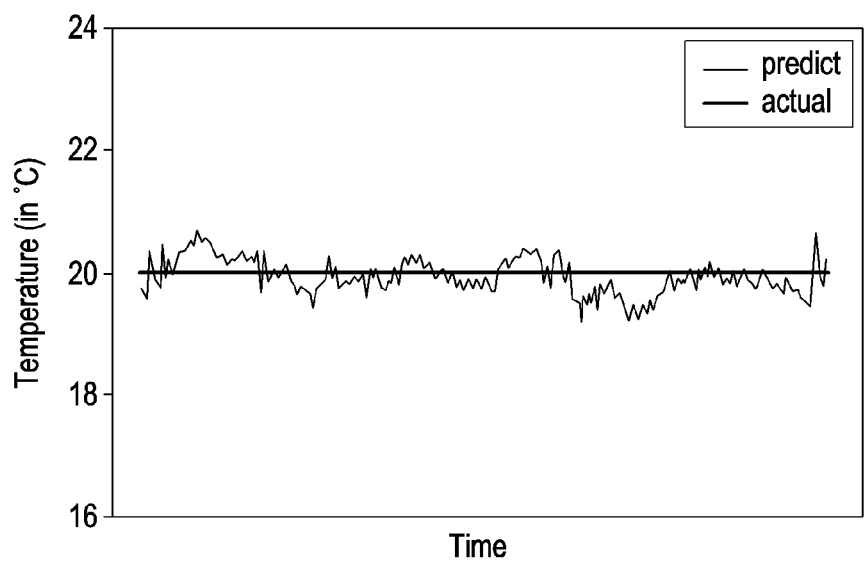
Figure 3C:
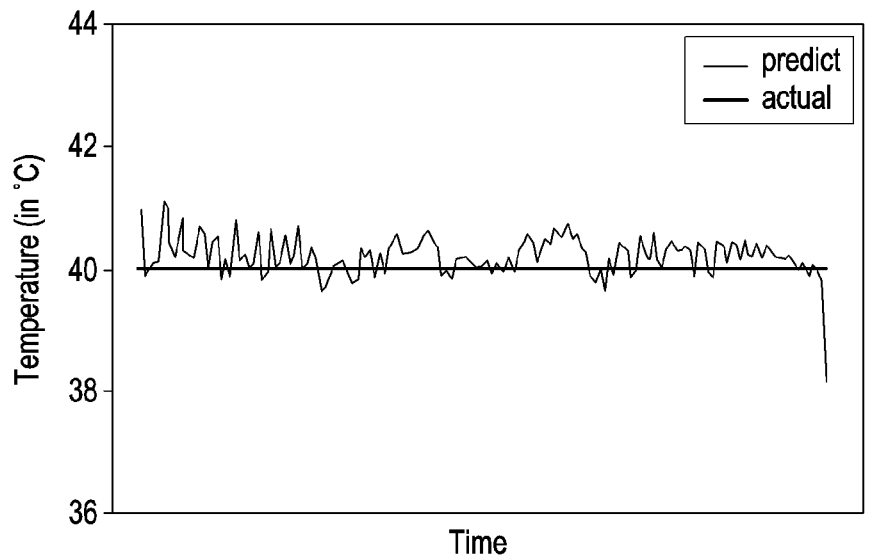
Figure 3D:
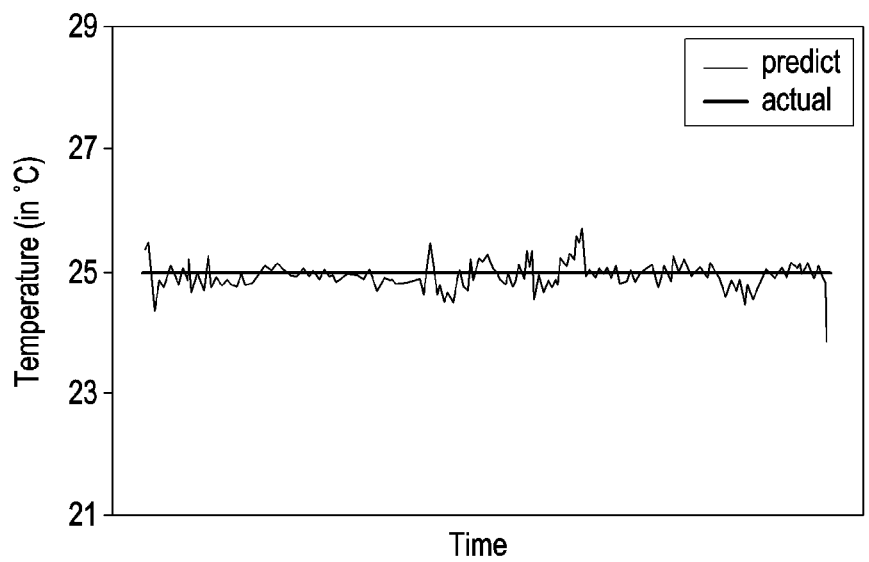

Similarly, as depicted in FIG. 3B, the neural network processor 103 is trained to predict the ambient temperature of the device 100 when the device is subjected to heavy usage at an ambient temperature of 20° C. As depicted in FIG. 3C, the neural network processor 103 is trained to predict the ambient temperature of the device 100 when a video recording application is run at an ambient temperature of 40° C. As depicted in FIG. 3D, the neural network processor 103 is trained to predict the ambient temperature of the device 100 when a video conference application or a meeting application is run at an ambient temperature of 25° C.

The highest accuracy in the predicted values of the ambient temperature of the device 100 is obtained when the neural network model is constructed with three hidden layers, wherein the sizes of the hidden layers, in terms of the number of neurons, are 25, 12, and 8, respectively. The activation function used in the neural network processor 103 is the tangent-(hyperbolic) function.

Figure 4:
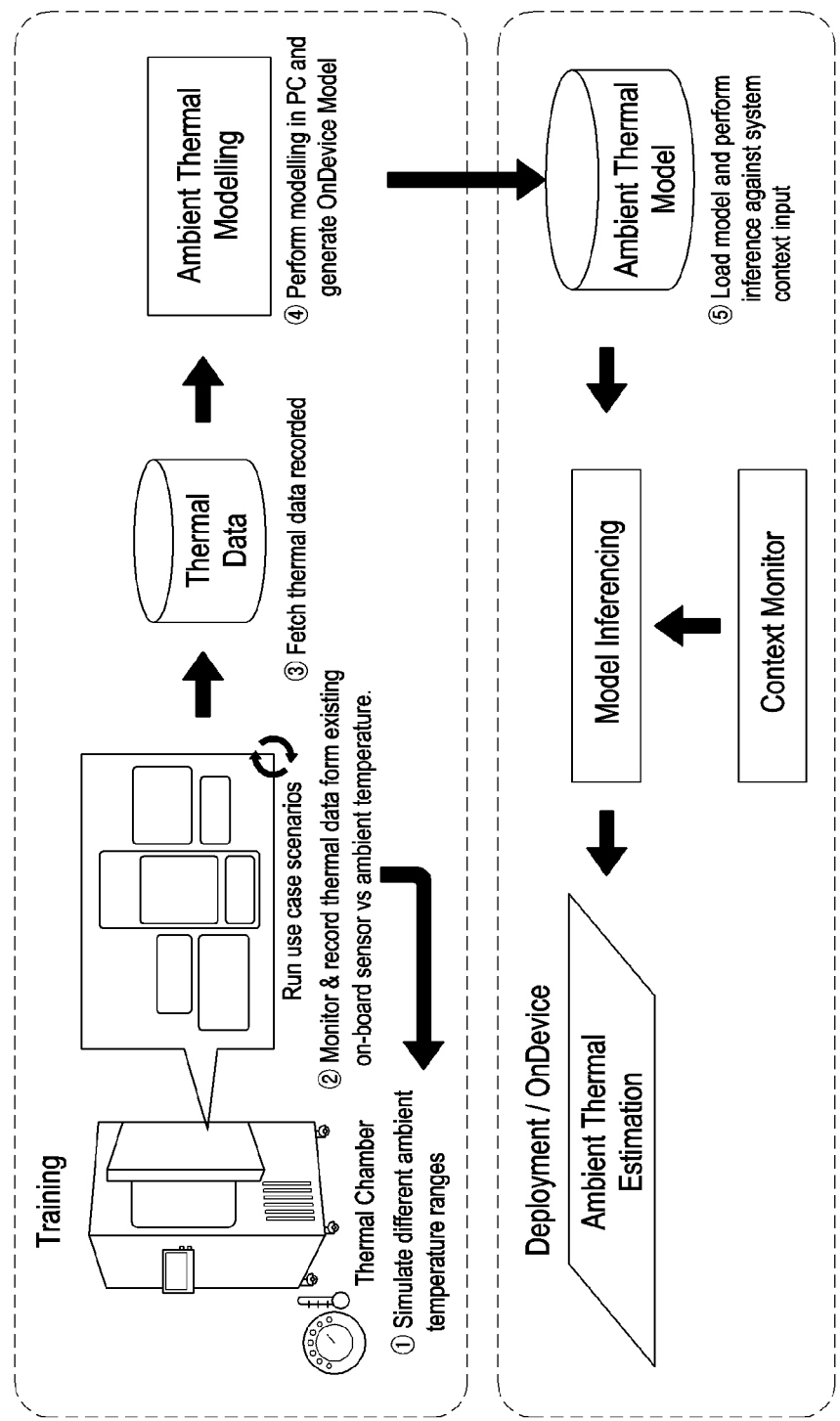
FIG. 4 illustrates an operational workflow of the neural network model involved in estimating the temperature of the ambience of the device and the cause of overheating of the device, according to embodiments as disclosed herein.

FIG. 4 illustrates an operational workflow of the neural network processor 103 involved in estimating the temperature of the ambience of the device 100 and the cause of overheating of the device 100, according to embodiments as disclosed herein. As depicted in FIG. 4, the neural network processor 103 is trained in a thermal chamber. The process of training can be referred to as Ambient Thermal Modeling. The neural network processor 103 can be trained in different scenarios at different ambient temperatures. The thermal chamber is maintained at different ambient temperatures to train the neural network processor 103 in the different scenarios at the different ambient temperatures. Once the neural network processor 103 is trained, the neural network processor 103 can determine the cause of overheating of the device 100 and the temperature of the ambience of the device 100.

The neural network processor 103 can obtain Thermal Data, which are the values of the plurality of parameters capable of contributing to the temperature of device, received as input features. Based on the features, the neural network processor 103 is configured to predict the temperature of the ambience of the device 100. If there are errors between the predicted values of ambient temperature and the temperature of the thermal chamber, the weights of the hidden layers of the neural network processor 103 are updated. With successive corrections of the weights the neural network processor 103, updating the number of hidden layers, and the number of neurons in each hidden layer, the neural network processor 103 is able to accurately predict the ambient temperature.

Once the training is completed, the Ambient Thermal Model is obtained. The trained neural network processor 103, i.e., Ambient Thermal Model, can be deployed in the device 100. The Model Inference takes place when the neural network processor 103 receives the actual values of parameters that are contributing to the temperature of the device 100. The values of the parameters that are contributing to the temperature of the device 100 represent the Context. The device 100 monitors the different parameters (Context Monitor) and the Ambient Thermal Model periodically estimates the Ambient Temperature of the device 100 based on internal and external factors contributing to the temperature of the device 100.

The neural network processor 103 can be deployed on all types of devices after training. The neural network processor 103 is robust and lightweight, and the latency of the neural network processor 103 is low. The neural network processor 103 determine the cause of overheating of the device 100 and estimate the temperature of the ambience of the device 100, without the device 100 going into the idle mode. The deployment of the neural network processor 103 is flexible, as the neural network processor 103 can be deployed on any chipset, irrespective of the Printed Circuit Board (PCB) layout.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein describe methods and systems for estimating the temperature of the ambience of the device, estimating the temperatures of internal factors in the device that are contributing to the temperature of the device, and whether the temperature of the device is greater than the temperature of the ambience of the device, using a regression neural network and a classification neural network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, an embodiment may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for determining a cause of overheating of a device, the method comprising:
    monitoring, by the device, a plurality of parameters that are contributing to a temperature of the device;
    estimating, by the device, a degree of contribution of internal factors to the temperature of the device and a degree of contribution of external factors to the temperature of the device, based on the monitored plurality of parameters and a battery temperature of a battery of the device; and
    determining, by a classifier neural network, whether the degree of contribution of the internal factors to the temperature of the device is greater than the degree of contribution of the external factors to the temperature of the device, based on whether the battery temperature is greater than an ambient temperature of the device,
    wherein when the battery temperature is greater than the ambient temperature of the device, then the degree of contribution of the internal factors to the temperature of the device is greater than the degree of contribution of the external factors to the temperature of the device, and
    wherein when the battery temperature is less than the ambient temperature of the device, then the degree of contribution of the external factors to the temperature of the device is greater than the degree of contribution of the internal factors to the temperature of the device.

2. The method, as claimed in claim 1, further comprising:
    determining, by a regression neural network, the degree of contribution of the internal factors to the temperature of the device, based on the monitored plurality of parameters,
    wherein the degree of contribution of the internal factors represents a difference between the battery temperature and an ambient temperature of the device.

3. The method, as claimed in claim 2, wherein estimating the degree of contribution of the external factors to the temperature of the device is determined based on the degree of contribution of the internal factors to the temperature of the device and the battery temperature.

4. The method, as claimed in claim 1, wherein the plurality of parameters comprises at least one of Central Processing Unit (CPU) load, Graphics Processing Unit (GPU) load, data upload rate, data download rate, average battery temperature, screen brightness, State of Charge (SoC) level of the battery of the device, discharge rate of the battery of the device, rate of variation of temperature of the battery of the device, instantaneous temperature of the battery of the device, volume of at least one speaker in the of the battery of the device, current flowing through the battery of the device, lux, and hardware components of the device, and number of frames-per-second in display.

5. The method, as claimed in claim 1, wherein:
    a regression neural network and the classifier neural network comprises three hidden layers, wherein a first hidden layer comprises 25 neurons, a second hidden layer comprises 12 neurons, and a third hidden layer comprises 8 neurons.

6. An on-device method for estimating ambient temperature of a device, the method comprising:
    monitoring, by the device, a plurality of parameters comprising a battery temperature of a battery of the device, processor, thermal zones, voltage, current, instantaneous Central Processing Unit (CPU) load, average CPU load, Graphics Processing Unit (GPU) usage, and screen brightness;
    monitoring, by the device, a plurality of external parameters comprising lux, Wireless-Fidelity (Wi-Fi) signal strength, and network signal strength;
    determining, by a regression neural network in the device, a temperature representing a result of subtraction of the ambient temperature of the device from the battery temperature, based on the plurality of parameters and the plurality of external parameters;
    determining, by the device, the ambient temperature of the device based on the determined temperature and the battery temperature;
    determining, by a classifier neural network, whether a cause of overheating of the device is due to one of internal factors and external factors;
    classifying the cause of overheating of the device due to the internal factors when the battery temperature is greater than the ambient temperature of the device; and
    classifying the cause of overheating of the device due to the external factors, when the battery temperature is less than the ambient temperature of the device.

7. The method, as claimed in claim 6, wherein determining the ambient temperature of the device comprises adding the determined temperature to the battery temperature, when the result of the subtraction is negative.

8. The method, as claimed in claim 6, wherein determining the ambient temperature of the device comprises subtracting the determined temperature from the battery temperature, when the result of the subtraction is positive.

9. The method, as claimed in claim 6, further comprising:
    determining, by a classification neural network in the device, whether a cause of overheating of the device is due to one of internal factors and external factors;
    classifying the cause of overheating of the device due to the internal factors when the battery temperature is greater than the ambient temperature of the device; and
    classifying the cause of overheating of the device due to the external factors, when the battery temperature is less than the ambient temperature of the device.

10. A device for determining a cause of overheating of the device, the device comprising:
a neural network processor including a classifier neural network configured to:
monitor a plurality of parameters that are contributing to a temperature of the device;
estimate a degree of contribution of internal factors to the temperature of the device and a degree of contribution of external factors to the temperature of the device, based on the monitored plurality of parameters and a battery temperature of a battery of the device; and
determine whether the degree of contribution of the internal factors to the temperature of the device is greater than the degree of contribution of the external factors to the temperature of the device, based on whether the battery temperature is greater than an ambient temperature of the device;
wherein when the battery temperature is greater than the ambient temperature of the device, then the classifier neural network is configured to determine that the degree of contribution of the internal factors to the temperature of the device is greater than the degree of contribution of the external factors to the temperature of the device; and
wherein when the battery temperature is less than the ambient temperature of the device, then the classifier neural network is configured to determine that the degree of contribution of the external factors to the temperature of the device is greater than the degree of contribution of the internal factors to the temperature of the device.

11. The device, as claimed in claim 10, wherein the neural network processor includes a regression neural network, wherein the regression neural network is configured to:
determine the degree of contribution of the internal factors to the temperature of the device, based on the monitored plurality of parameters,
wherein the degree of contribution of the internal factors represents a difference between the battery temperature and an ambient temperature of the device.

12. The device, as claimed in claim 11, wherein the degree of contribution of the external factors to the temperature of the device is determined based on the degree of contribution of the internal factors to the temperature of the device and the battery temperature.

13. The device, as claimed in claim 10, wherein the plurality of parameters comprises at least one of Central Processing Unit (CPU) load, Graphics Processing Unit (GPU) load, data upload rate, data download rate, average battery temperature, screen brightness, State of Charge (SoC) level of the battery of the device, discharge rate of the battery of the device, rate of variation of temperature of the battery of the device, instantaneous temperature of the battery of the device, volume of at least one speaker in the of the battery of the device, current flowing through the battery of the device, lux, and hardware components of the device, and number of frames-per-second in display.

14. The device, as claimed in claim 10, wherein:
the neural network processor comprises a regression neural network and the classifier neural network, and
the regression neural network and the classifier neural network comprises three hidden layers, wherein a first hidden layer comprises 25 neurons, a second hidden layer comprises 12 neurons, and a third hidden layer comprises 8 neurons.

15. A device for estimating ambient temperature of the device, the device comprising:
a neural network processor including a classifier neural network, wherein the neural network processor is configured to:
monitor a plurality of parameters comprising a battery temperature of a battery of the device, processor, thermal zones, voltage, current, instantaneous Central Processing Unit (CPU) load, average CPU load, Graphics Processing Unit (GPU) usage, and screen brightness;
monitor a plurality of external parameters comprising lux, Wireless-Fidelity (Wi-Fi) signal strength, and network signal strength;
determining, by a regression neural network in the device, a temperature representing a result of subtraction of the ambient temperature of the device from the battery temperature, based on the plurality of parameters and the plurality of external parameters;
determining, by the device, the ambient temperature of the device based on the determined temperature and the battery temperature;
determine whether a cause of overheating of the device is due to one of internal factors and external factors;
classify the cause of overheating of the device due to the internal factors when the battery temperature is greater than the ambient temperature of the device; and
classify the cause of overheating of the device due to the external factors, when the battery temperature is less than the ambient temperature of the device.

16. The device, as claimed in claim 15, wherein to determine the ambient temperature of the device the neural network processor is configured to add the determined temperature to the battery temperature, when the result of the subtraction is negative.

17. The device, as claimed in claim 15, wherein to determine the ambient temperature of the device the neural network processor is configured to subtract the determined temperature from the battery temperature, when the result of the subtraction is positive.

* * * * *